(12) United States Patent
Brannon et al.

(10) Patent No.: US 7,322,411 B2
(45) Date of Patent: Jan. 29, 2008

(54) METHOD OF STIMULATING OIL AND GAS WELLS USING DEFORMABLE PROPPANTS

(75) Inventors: Harold Dean Brannon, Magnolia, TX (US); Allan Ray Rickards, Tomball, TX (US); Christopher John Stephenson, Houston, TX (US); Russell L. Maharidge, Spring, TX (US)

(73) Assignee: BJ Services Company, Houston, TX (US)

( * ) Notice: Subject to any disclaimer, the term of this patent is extended or adjusted under 35 U.S.C. 154(b) by 260 days.

(21) Appl. No.: 11/034,388

(22) Filed: Jan. 12, 2005

(65) Prior Publication Data
US 2006/0151170 A1 Jul. 13, 2006

(51) Int. Cl.
*E21B 43/267* (2006.01)
(52) U.S. Cl. .................. 166/280.2; 166/308.1
(58) Field of Classification Search ......... 166/280, 166/308
See application file for complete search history.

(56) References Cited

U.S. PATENT DOCUMENTS

| | | | |
|---|---|---|---|
| 3,481,401 A * | 12/1969 | Graham | 166/280.2 |
| 3,597,784 A | 8/1971 | Gehlen | |
| 3,659,651 A | 5/1972 | Graham | |
| 3,888,311 A * | 6/1975 | Cooke, Jr. | 166/280.2 |
| 4,527,627 A | 7/1985 | Graham et al. | |
| 4,547,468 A | 10/1985 | Jones et al. | |
| 4,553,596 A | 11/1985 | Graham et al. | |
| 5,305,832 A | 4/1994 | Gupta et al. | |
| 5,422,183 A | 6/1995 | Sinclair et al. | |
| 5,562,160 A | 10/1996 | Brannon et al. | |
| 5,597,784 A | 1/1997 | Sinclair et al. | |
| 5,837,656 A | 11/1998 | Sinclair et al. | |
| 6,017,655 A | 1/2000 | Ovshinsky et al. | |
| 6,059,034 A | 5/2000 | Rickards et al. | |
| 6,169,058 B1 | 1/2001 | Le et al. | |
| 6,279,656 B1 | 8/2001 | Sinclair et al. | |
| 6,330,916 B1 | 12/2001 | Rickards et al. | |
| 6,364,018 B1 | 4/2002 | Brannon et al. | |
| 6,439,309 B1 | 8/2002 | Matherly et al. | |

(Continued)

OTHER PUBLICATIONS

Wood, W.D., et al., "Ultra-Lightweight Proppant Development Yields New Opportunities In Hydraulic Fracturing Design," SPE Annual Technical Conference and Exhibition, Denver, CO, Oct. 2003, pp. 1-19, USA.

(Continued)

*Primary Examiner*—Frank Tsay
(74) *Attorney, Agent, or Firm*—John Wilson Jones; Jones & Smith, LLP

(57) ABSTRACT

A method of fracturing using deformable proppants minimizes proppant pack damage, without compromising the fracturing fluid's proppant transport properties during pumping, by use of deformable proppants. Selection of proppant is dependent upon the mechanical properties of the formation rock. The strength of the deformable proppant is dependent upon the modulus of the formation rock being treated such that the proppant is capable of providing, at the very least, a minimum level of conductivity in in-situ stress environments. The maximum elastic modulus of the deformable proppant is less than the minimum modulus of the formation rock which is being treated. The method is particularly applicable in fracturing operations of subterranean reservoirs such as those comprised primarily of coal, chalk, limestone, dolomite, shale, siltstone, diatomite, etc.

20 Claims, 7 Drawing Sheets

U.S. PATENT DOCUMENTS

| | | |
|---|---|---|
| 6,508,305 B1 | 1/2003 | Brannon et al. |
| 6,749,025 B1 | 6/2004 | Brannon et al. |
| 6,772,838 B2 | 8/2004 | Dawson et al. |
| 2004/0040708 A1 | 3/2004 | Stephenson et al. |
| 2005/0016732 A1 | 1/2005 | Brannon et al. |
| 2005/0028979 A1 | 2/2005 | Brannon et al. |
| 2005/0274523 A1 | 12/2005 | Brannon et al. |
| 2006/0047027 A1 | 3/2006 | Brannon et al. |
| 2006/0065398 A1 | 3/2006 | Brannon et al. |
| 2006/0073980 A1 | 4/2006 | Brannon et al. |

OTHER PUBLICATIONS

Darin, S.R., et al., "Effect of a Partial Monolayer of Propping Agent on Fracture Flow Capacity," SPE 34th Annual Fall Meeting, Dallas, TX, Oct. 1959, pp. 31-37, USA.

Technology Update, "Ultralightweight Proppants Possess the Ability to Alter Fracturing Techniques," Jul. 2004, pp. 1-3, USA.

* cited by examiner

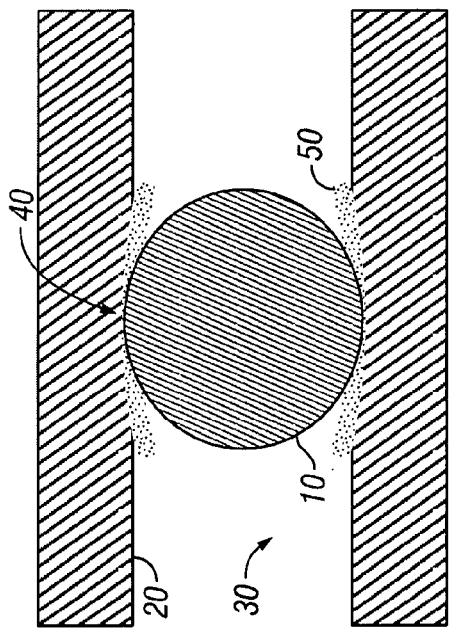
FIG. 1(a)
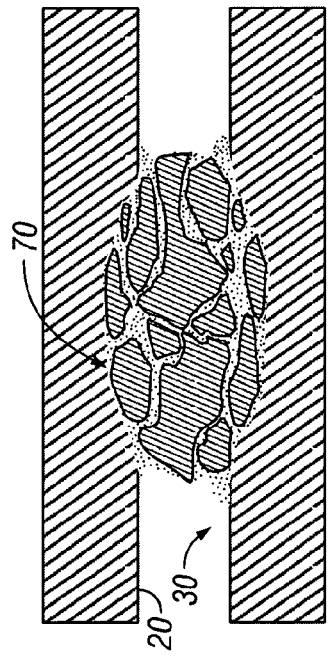
FIG. 1(b)
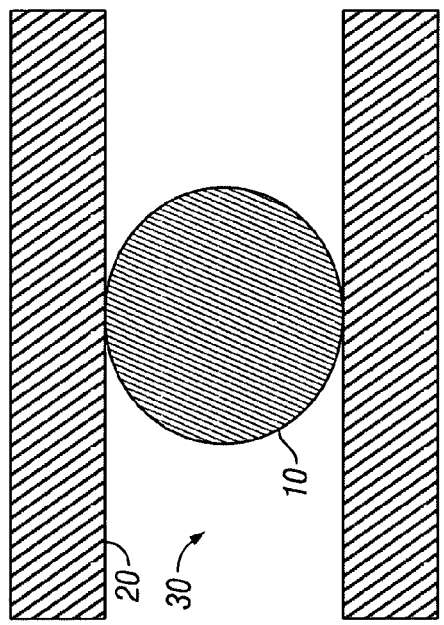
FIG. 1(c)
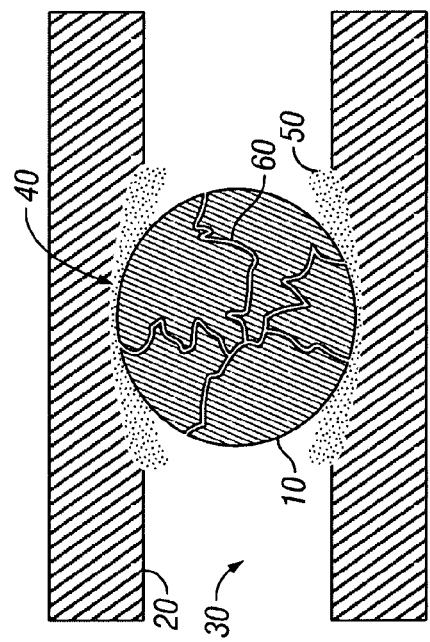
FIG. 1(d)
FIG. 1 (Prior Art)

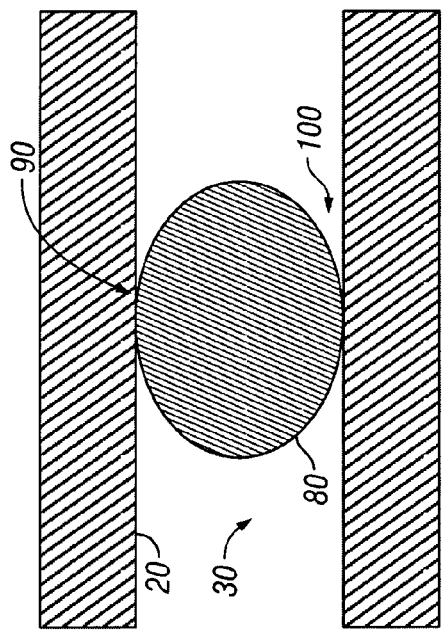
FIG. 2(a)
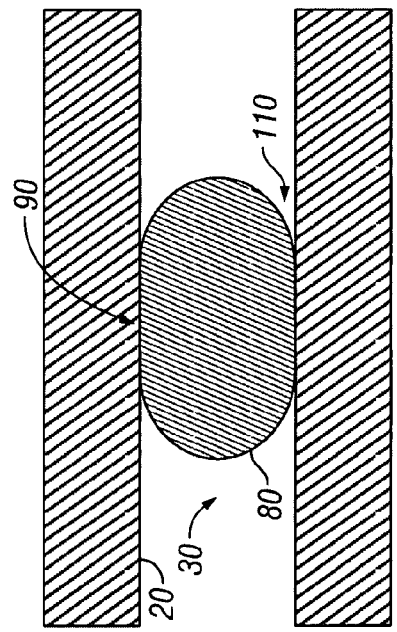
FIG. 2(b)
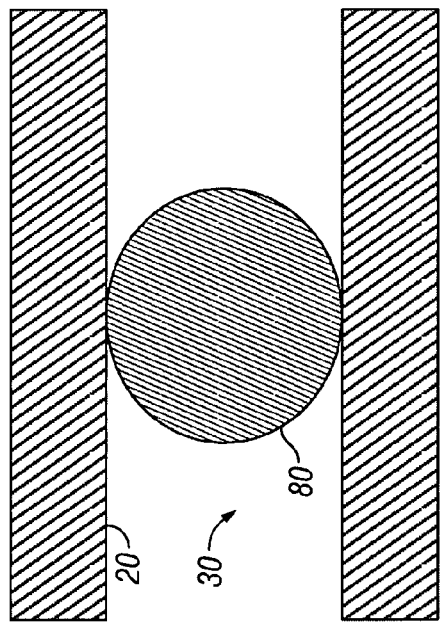
FIG. 2(c)
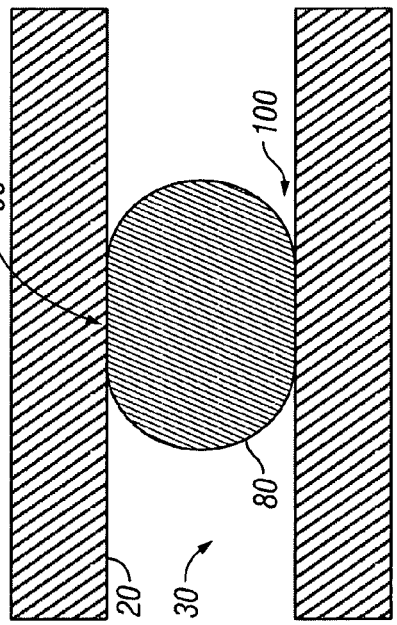
FIG. 2(d)
FIG. 2

METHOD OF STIMULATING OIL AND GAS WELLS USING DEFORMABLE PROPPANTS

FIELD OF THE INVENTION

The invention relates to a method of fracturing using deformable proppants in order to minimize fines generation and proppant pack damage. The method of the invention has particular applicability in the fracturing of subterranean reservoirs such as those comprised primarily of coal, chalk, limestone, dolomite, shale, siltstone, diatomite, etc.

BACKGROUND OF THE INVENTION

Hydraulic fracturing is a common stimulation technique used to enhance production of fluids from subterranean formations. In a typical hydraulic fracturing treatment, fracturing treatment fluid containing a solid proppant is injected into the wellbore at pressures sufficient to create or enlarge a fracture in the reservoir. The proppant is deposited in the fracture, where it remains after the treatment is completed. The proppant serves to hold the fracture open, thereby enhancing the ability of fluids to migrate from the formation to the wellbore through the fracture. Because well productivity depends on the ability of a fracture to conduct fluids from the formation to the wellbore, fracture conductivity is an important parameter in determining the degree of success of a hydraulic fracturing treatment.

Fracture conductivity may be reduced by small proppants or fines. In fracture conductivity testing using proppants of the prior art confined between sandstone cores, embedment of proppant into the core is frequently observed after exposure to elevated stress. In the process of embedment, spalling of fines from the rock is displaced into the proppant pack. Proppant pack conductivity damage from embedment results in loss of proppant pack width as the proppant embeds into the rock and proppant pack pore throats are plugged by displaced formation fines. The pack permeability is thereby reduced.

A second source of fines results from proppant crushing. Such fines are generated at the fracture-face to proppant pack interface as in situ closure stresses acting upon the fracture cause failure of the proppant, the formation rock, or both. Such stresses may cause the proppant to be compressed together such that fines are generated from the proppant pack and/or reservoir matrix. Further, fines composed of formation material (e.g., shale, sand, coal fines, etc.) may present similar problems and may be produced, for example, within the fractured formation due to stresses and forces applied to the formation during fracturing.

Proppant packs containing sand with a deformable proppant substantially reduce proppant crushing. Such proppant packs are disclosed in U.S. Pat. Nos. 6,059,034 and 6,330,916, herein incorporated by reference. In addition to sand, such proppant packs contain deformable additives which act as a cushion and minimize the point stresses applied to the proppant and limit crushing of the sand. However, at elevated stress levels, the permeability and porosity levels of such proppant packs are compromised by embedment and spalling.

Alternate methods of reducing proppant pack damage and minimizing fines generation at increased stress levels have therefore been sought in order to increase the productivity of subterranean reservoirs.

SUMMARY OF THE INVENTION

The present invention relates to a method of minimizing proppant pack damage, without compromising the fracturing fluid's proppant transport properties during pumping, by use of deformable proppants. The method thereby improves the retained proppant pack permeability and, ultimately, the well's production. The method is particularly efficacious in minimizing plugging of proppant pack pore throats by migrating fines.

The deformable proppants used in the invention are softer than conventional proppants. As a result, they are capable of absorbing damaging stresses applied to the proppant pack. The proppant particulates act as cushions and such cushions are distributed uniformly throughout the proppant pack. Point stresses applied to the proppant are thereby minimized.

The strength of the deformable proppant used in the invention is dependent upon the hardness (or modulus) of the formation rock being treated. In particular, the modulus of the deformable proppant is such that the proppant is capable of providing, at the very least, a minimum level of conductivity in in situ stress environments. Further, the maximum elastic modulus of the deformable proppant for use in the method of invention is less than the minimum modulus of the formation rock which is being treated.

Preferred as deformable proppants for use in the invention are:

(I.) naturally occurring materials, such as (a.) chipped, ground or crushed shells of nuts such as walnut, pecan, coconut, almond, ivory nut, brazil nut, etc.; (b.) chipped, ground or crushed seed shells (including fruit pits) of seeds of fruits such as plum, olive, peach, cherry, apricot, etc.; (c.) chipped, ground or crushed seed shells of other plants such as maize (e.g., corn cobs or corn kernels), etc.; and (d.) processed wood materials such as those derived from woods such as oak, hickory, walnut, poplar, mahogany, etc. Such proppants are strengthened or hardened with a protective coating or modifying agent which increases the ability of the material to resist deformation by strengthening or hardening the material (e.g., by increasing the elastic modulus of the naturally occurring material);

(II.) substantially spherical or beaded proppants of copolymers, such as polystyrene divnylbenzene, terpolymers, such as polystyrene/vinyl/divinyl benzene and acrylate-based terpolymers, and polymers of furfuryl derivatives, phenol formaldehyde, phenolic epoxy resins, polystyrene, methyl methacrylate, nylon, polycarbonates, polyethylene, polypropylene, polyvinylchloride, polyacrylonitrile-butadiene-styrene, polyurethane and mixtures thereof; and (III.) well treating aggregates composed of an organic lightweight material and a weight modifying agent.

The method of the invention is particularly applicable in fracturing operations of soft subterranean reservoirs such as those comprised primarily of coal, chalk, limestone, dolomite, shale, siltstone, diatomite, etc.

BRIEF DESCRIPTION OF THE DRAWINGS

In order to more fully understand the drawings referred to in the detailed description of the present invention, a brief description of each drawing is presented, in which:

FIG. 1 (prior art) illustrates the formation of spalling and fines using non-deformable proppant proppants.

FIGS. 2(a) through 2(d) illustrate reduced formation spalling and fines by use of deformable proppants.

FIGS. 6-8 are prior art displacement curves showing results with non-deformable proppant and FIGS. 4-5 are displacement curves showing results with deformable proppants.

DETAILED DESCRIPTION OF THE PREFERRED EMBODIMENTS

Figure 3:
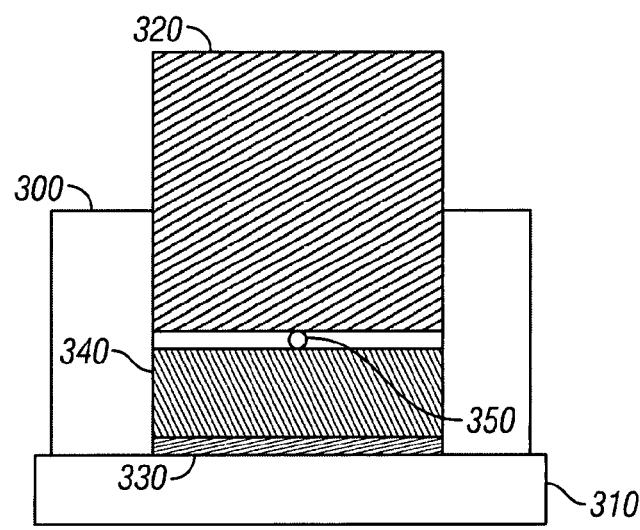
FIG. 3 is a schematic diagram of the proppant embedment test cell, discussed in the Examples.

The deformable proppants for use in the invention are capable of minimizing proppant pack damage and mitigating the formation of fines and crushed proppants during the fracturing process. After exposure of maximum applicable closure stresses, use of the deformable proppants of the invention exhibit little, if any, embedment of the proppants in the formation rock subjected to fracturing. Thus, such deformable proppants improve the retained proppant pack permeability. Productivity of the well is therefore enhanced.

The deformable proppants have particular applicability in fracturing operations of low permeability subterranean reservoirs such as those comprised primarily of coal, limestone, dolomite, shale, siltstone, diatomite, etc., known to be susceptible to fines generation due to their friable nature.

By "deformable" it is meant that the proppant particulates of the proppant pack substantially yield upon application of a minimum threshold level to point to point stress. The in situ deformation of the proppants form multi-planar structures or networks and thus serve as a cushion to prevent grain-to-grain contact and absorb stress. Such cushioning prevents the proppant from shattering or breaking due to stress (including stress induced by stress cycling). As a result, less fines are generated and permeability and/or conductivity is maintained. Such reduction in fines generation further permits the extension of the closure stress range in which the proppant pack may be used.

Selection of suitable deformable proppant for use in the invention is dependent upon the mechanical properties of the formation rock. In particular, the maximum modulus of the deformable proppant is selected such that it is less than the minimum modulus of the treated formation rock. The stress at which the proppant particulates are squeezed substantially flat is generally the maximum applicable stress for use of the proppant. Further, the modulus of the deformable proppant is such that the proppant is capable of providing, at the very least, a minimum level of conductivity in in situ stress environments.

Thus, the selected deformable proppant for use in the method of the invention may be selected to function in low to moderate stress environments (100 psi to 5,000 psi) as well as moderate to high stress environments (5,000 psi to 15,000 psi) while maintaining permeability and porosity of the fracture.

Thus, the deformable proppants used in the invention have an elastic modulus which is less than the maximum modulus of the formation rock, and yet exhibit sufficient integrity to resist gross proppant deformation. Typically, the deformable proppant has an elastic modulus of between about 500 psi and about 4,000,000 psi at in situ formation conditions. The requisite pack permeability is thereby maintained for a given in situ temperature and stress environment.

Since the selected deformable proppant is less hard than the rock of the subterranean formation, regardless of pressure or other physical parameters or mechanical properties placed on the formation, energy is absorbed by the proppant and not by the face of the rock when exposed to in-situ closure stresses. Thus, the proppant acts as a preferential cushion, absorbing the damaging stresses applied to the proppant pack via deformation of the deformable proppant particles. The cushion is distributed throughout the proppant pack, minimizing the point stresses applied to proppant particulates.

Examples of suitable deformable proppants include chipped, ground or crushed shells of nuts such as walnut, pecan, coconut, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization. In one embodiment, specific gravity of such materials may range from about 0.4 to about 4. Such materials may be otherwise processed to produce proppant material having any particle size or particle shape suitable for use in the method disclosed herein.

Such proppants may be optionally strengthened or hardened with a protective coating or modifying agent which increases the ability of the material to resist deformation by strengthening or hardening the material (e.g., by increasing the elastic modulus of the naturally occurring material). The resulting proppant has increased resistance (e.g., partial or complete resistance) to deformation under in situ formation or downhole conditions as compared to those proppants that have not been so modified.

Examples of suitable modifying agents include, but are not limited to, any compound or other material effective for modifying (e.g., crosslinking, coupling or otherwise reacting with) the proppant without degrading or otherwise damaging strength or hardness of the proppant, and/or without producing damaging by-products during modification that act to degrade or otherwise damage strength or hardness of the proppant (e.g., without liberating acids such as hydrochloric acid, organic acids, etc.).

Examples of suitable types of modifying agents include compounds containing silicon-oxygen linkages, cyanate groups, epoxy groups, etc. Specific examples of suitable modifying agents include, but are not limited to, polyisocyanate-based compounds, silane-based compounds, siloxane-based compounds, epoxy-based combinations thereof, etc.

Protective coatings for coating at least a portion of the aforementioned proppant particulates include at least one of phenol formaldehyde resin, melamine formaldehyde resin, urethane resin, or a mixture thereof. Other optional coating compositions known in the art to be useful as hardeners for such materials (e.g., coating materials that function or serve to increase the elastic modulus of the material) may be also employed in conjunction or as an alternative to protective coatings, and may be placed underneath or on top of one or more protective coatings. Such protective and/or hardening coatings may be used in any combination suitable for imparting desired characteristics to the proppant, including in two or more multiple layers. In this regard successive layers of protective coatings, successive layers of hardening coatings, alternating layers of hardening and protective coatings, etc. are possible. Mixtures of protective and hardening coating materials may also be possible.

Protective coatings typically are present in an amount of from about 1% to about 20%, alternatively from about 2% to about 10% by weight of total weight of proppant particulates. The amount of protective coating affects the strength of the resulting proppant and thus its applicability for a given rock formation. For instance, in a reservoir having an elastic modulus of 3,000,000 at 175° F. bottom hole static temperatures (BHST), and a closure stress of up to 6,000 psi, a relatively lightweight proppant having a thinner coating such as LiteProp™ 125, a product of BJ Services Company, is suitable as deformable proppant. In a shallow coal bed methane application with reservoir elastic modulus of 500,000, BHST of 100° F., and a closures stress of 300 psi, a deformable proppant having a thicker coatings, such as Flexsand™ LS, a product of BJ Services Company, is often the preferred choice.

Further examples of such deformable proppants include substantially spherical or beaded proppants of copolymers, such as polystyrene divnylbenzene, terpolymers, such as polystyrene/vinyl/divinyl benzene and acrylate-based terpolymers, and polymers of furfuryl derivatives, phenol formaldehyde, phenolic epoxy resins, polystyrene, methyl methacrylate, nylon, polycarbonates, polyethylene, polypropylene, polyvinylchloride, polyacrylonitrile-butadiene-styrene, polyurethane and mixtures thereof.

Further, such copolymers may be reacted with a crosslinker, such as divinyl benzene. The amount of crosslinker employed is typically dependent on the targeted hardness and glass transition temperature of the resulting proppant. In this regard, any amount of crosslinker suitable for forming a deformable proppant may be employed. For example, beads containing less divinylbenzene crosslinker are preferred at lower formation closure stresses, as well as at lower temperatures. Thus, changing the percentage of divinylbenzene crosslinker present in polystyrene divinylbenzene beads from about 14% to about 4% to about 0.5% to about 0.3% changes the confined elastic modulus at standard conditions from about 100,000 psi to about 70,000 psi to about 50,000 psi to about 30,000 psi, respectively.

Further preferred as proppants for use in the invention are those relatively lightweight deformable proppants having an apparent specific gravity (ASG) (API RP 60) less than 2.65. In a preferred embodiment, the relatively lightweight proppants are ultra lightweight (ULW) proppants having an ASG less than or equal to 2.45. Even more preferred are those ULW proppants having an ASG less than or equal to 2.25, preferably less than or equal to 2.0, more preferably less than or equal to 1.75, even more preferably less than or equal to 1.5, most preferably less than or equal to 1.25.

Included within such ULW proppants are well treating aggregates composed of an organic lightweight material and a weight modifying agent. The ASG of the organic lightweight material is either greater than or less than the ASG of the well treating aggregate depending on if the weight modifying agent is a weighting agent or weight reducing agent, respectively.

The aggregates are comprised of a continuous (external) phase composed of the organic lightweight material and a discontinuous (internal) phase composed of a weight modifying material. The amount of organic lightweight material in the aggregate is generally between from about 10 to about 90 percent by volume. The volume ratio of resin (continuous phase) to weight modifying agent (discontinuous phase) is generally between from about 20:80 to about 85:15, most preferably about 25:75. As an example, using an organic lightweight material having an ASG of 0.7 and a weight modifying agent, such as silica, having an ASG of 2.7, a 20:80 volume ratio would render an aggregate ASG of 2.20 and a 85:15 volume ratio would render an ASG of 1.0; a 75:25 volume ratio would render an ASG of 1.20.

The aggregate proppant diameter is typically approximately 850 microns. The average diameter of the weight modifying agent proppants is typically approximately 50 microns. The compressive strength of the aggregate is greater than the compressive strength of the organic lightweight material.

The organic lightweight material is preferably a polymeric material, such as a thermosetting resin, including polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, or a melamine formaldehyde resin. The ASG of the organic lightweight material generally less than or equal to 1.1. In a preferred embodiment, the ASG of the material is between about 0.7 to about 0.8.

In a preferred mode, the ASG of the well treating aggregate is at least about 0.35. In a most preferred mode, the ASG of the well treating aggregate is at least about 0.70, more preferably 1.0, but not greater than about 2.0.

The weight modifying agent may be sand, glass, hematite, silica, sand, fly ash, aluminosilicate, and an alkali metal salt or trimanganese tetraoxide. In a preferred embodiment, the weight modifying agent is selected from finely ground sand, glass powder, glass spheres, glass beads, glass bubbles, ground glass, borosilicate glass or fiberglass. Further, the weight modifying agent may be a cation selected from alkali metal, alkaline earth metal, ammonium, manganese, and zinc and an anion selected from a halide, oxide, a carbonate, nitrate, sulfate, acetate and formate. For instance, the weight modifying agent may include calcium carbonate, potassium chloride, sodium chloride, sodium bromide, calcium chloride, barium sulfate, calcium bromide, zinc bromide, zinc formate, zinc oxide or a mixture thereof.

Glass bubbles and fly ash are the preferred components for the weight reducing agent.

The aggregates are generally prepared by blending the organic lightweight material with weight modifying agent for a sufficient time in order to form a slurry or a mud which is then formed into sized proppants. Such proppants are then hardened by curing at temperatures ranging from about room temperature to about 200° C., preferably from about 50° C. to about 150° C. until the weight modifying agent hardens around the organic lightweight material.

In a preferred mode, the organic lightweight material forms a continuous phase, the weight modifying forming a discontinuous phase.

The ASG of the well treating aggregate is generally less than or equal to 2.0, preferably less than or equal to 1.5, to meet the pumping and/or downhole formation conditions of a particular application, such as hydraulic fracturing treatment, sand control treatment.

Such relatively lightweight proppants exhibit an elastic modulus of between about 500 psi and about 4,000,000 psi at formation conditions, more typically between about 5,000 psi and about 500,000 psi, more typically between about 5,000 psi and 200,000 psi at formation conditions, and most typically between about 7,000 psi and 150,000 psi at formation conditions. The elastic modulus of a well treating aggregate is substantially higher than the elastic modulus of the organic lightweight material or the weighting agent.

Where the weight modifying agent is a weighting agent, the ASG of the well treating aggregate is at least one and a half times the ASG of the organic lightweight material, the ASG of the well treating aggregate preferably being at least about 1.0, preferably at least about 1.25. In a preferred embodiment, the ASG of the organic lightweight material in such systems is approximately 0.7 and the ASG of the well treating aggregate is between from about 1.05 to about 1.20.

Where the weight modifying agent is a weight reducing agent, the ASG of the weight reducing agent is less than 1.0 and the ASG of the organic lightweight material is less than or equal to 1.1.

The weight modifying agent may be a weighting agent having a higher ASG than the organic lightweight material. The presence of the weighting agent renders a well treating aggregate having a ASG greater than the ASG of the organic lightweight material. Alternatively, the weight modifying agent may be a weight reducing agent having a lower ASG than the organic lightweight material. The presence of the weight reducing agent renders a well treating aggregate having a ASG less than the ASG of the organic lightweight material.

The amount of weight modifying agent in the well treating aggregate is such as to impart to the well treating aggregate the desired ASG. Typically, the amount of weight modifying agent in the well treating aggregate is between from about 15 to about 85 percent by volume of the well treating aggregate, most preferably approximately about 52 percent by volume. The sizes of the weight modifying agent are preferably between from about 10 microns to about 200 microns.

Further, a mixture of any of the deformable proppants may be utilized. As such, it is possible to use at least two materials having different deformation characteristics (such as differing values of elastic modulus). The first and second substantially deformable proppants, for example, may have different values of in situ elastic modulus. For example, a first deformable proppant having an in situ elastic modulus of from about 500 psi to about 2,000,000 psi, may be combined with a second deformable proppant having an in situ elastic modulus of from about 500 psi to about 2,000,000 psi (alternatively from about 50,000 psi to about 150,000 psi), for example, for use in a relatively low stress closure stress environment. In another example, a first deformable proppant having an in situ elastic modulus of from about 2,000,000 psi to about 30,000,000 psi, may be combined with a second deformable proppant having an in situ elastic modulus of from about 500 psi to about 2,000,000 psi, for example, for use in a relatively high stress closure stress environment. Alternatively, the first and second substantially deformable materials may have similar or same values of in situ elastic modulus. Possible particle configurations include, but are not limited to, layered particles (such as concentrically layered particles), agglomerated particles, stratified particles, etc.

While the above proppants are generally referred to as substantially spherical, the deformable proppants for use in the invention may be any size or shape suitable for forming cushions in situ. For instance, in addition to being beaded or non-beaded, the deformable proppants for use in the invention may be non-spherical such as an elongated, tapered, egg, tear drop or oval shape or mixtures thereof. For instance, the proppants may have a shape that is cubic, bar-shaped (as in a hexahedron with a length greater than its width, and a width greater than its thickness), cylindrical, multi-faceted, irregular, or mixtures thereof. In addition, the deformable proppants may have a surface that is substantially roughened or irregular in nature or a surface that is substantially smooth in nature. Moreover, mixtures or blends of deformable proppants having differing, but suitable, shapes for use in the disclosed method further be employed.

In one embodiment, when deformable proppants having a cylindrical shape or an elongated beaded shape with a substantially uniform diameter, the proppant may have a maximum length aspect ratio equal to or less than about 5. As used herein, "maximum length based aspect ratio" means the maximum aspect ratio that may be obtained by dividing the length of the proppant by the minimum (or shortest) dimensional value that exists along any other axis (other than the length axis) taken through the center of mass of the proppant.

Any carrier fluid suitable for transporting a mixture of fracture proppant material into a formation fracture in a subterranean well may be employed with the deformable proppant including, but not limited to, carrier fluids comprising salt water, fresh water, liquid hydrocarbons, and/or nitrogen or other gases. Suitable carrier fluids include or may be used in combination with fluids have gelling agents, cross-linking agents, gel breakers, curable resins, hardening agents, solvents, surfactants, foaming agents, demulsifiers, buffers, clay stabilizers, acids, or mixtures thereof.

The deformable proppant may further be substantially neutrally buoyant in the carrier fluid. The term "substantially neutrally" refers to the condition wherein the proppant has an ASG sufficiently close to the ASG of the carrier fluid which allows pumping and satisfactory placement of the proppant into the formation. For instance, with the well treating aggregates, the ASG of the aggregate is selected so as to be close to the ASG of the carrier fluid. For example, the organic lightweight material may be treated with a weight modifying agent in such a way that the resulting well treating aggregate has a ASG close to the ASG of the carrier fluid so that it is neutrally buoyant or semi-buoyant in the fracturing fluid.

FIG. 1 illustrates the formation of spalling and fines using a non-deformable proppant 10 such as sand. The proppant is shown within the fracture 30 of formation 20. In FIG. 1(*b*), embedment 40 of the non-deformable proppant into the exposed faces of the formation 20 creates formation spalling and the generation of fines 50. FIG. 1(*c*) illustrates the commencement of grain failure, at 60, of non-deformable proppant 10 as embedment increases. With increasing application of closure stress, increased embedment is evidenced, at 70, wherein the non-deformable proppant is crushed and formation fines form. The severity of embedment increases with the maximum applied closure stress.

FIGS. 2(*a*) through 2(*d*), in contrast, illustrate the effects encountered by use of deformable proppant 80. Initial placement of deformable proppant 80 is illustrated in FIG. 2(*a*) wherein the proppant is shown in fracture 30 of formation 20. Increased pressure placed in the formation, illustrated in FIGS. 2(*b*) and 2(*c*) causes limited embedment, at 90, and reduced formation spalling and generation of fines, at 100. Further increased pressure, FIG. 2(*d*) demonstrates reduced fracture damage (less width loss and fines damage), at 110.

Deformable relatively lightweight proppants have particular applicability in minimizing coal fines generation that may result from "spalling" caused by embedment of the hydraulic fracture proppant into the exposed faces of the rock.

The following examples will illustrate the practice of the present invention in its preferred embodiments.

All parts are given in terms of weight units except as may otherwise be indicated.

LiteProp™ 125, a product of BJ Services Company, is a proppant having an ASG of 1.25.

EXAMPLES

The degree of embedment of 20/40 (mesh size) LiteProp™ 125 and 20/40 Ottawa sand was determined by compressing a partial mono-layer (i.e., 43 particles/in$^2$) of proppant against a shale core and measuring the displacement of a steel piston as a function of applied load, as exemplified in FIG. 3. The test, or embedment, cell was composed of a thick-walled stainless steel cylinder 300 and base plate 310, a 1-inch diameter steel piston 320, porous plate 330 on which the core sample 340 was placed. The proppant 350 was placed against core sample 340. Steel piston 320 pressed proppant 350 into core sample 340, and its displacement was used to infer proppant embedment.

Embedment was inferred by subtracting out the displacements of the core, test cell, and proppant compression. Mathematically, embedment ($\Delta x_{emb}$) was calculated from the following expression:

$$(\Delta x_{emb}) = (\Delta x_{gross}) - (\Delta x_{sys}) - (\Delta x_{core}) - (\Delta x_{prop}) \quad (1)$$

Details of the steps taken to infer embedment were as follows:

1. Gross displacement versus load, $\Delta x_{gross}$, of a partial monolayer of proppant was measured the against the core sample.

2. Displacement of the embedment cell, $\Delta x_{sys}$, was then measured. $\Delta x_{sys}$, was parameterize by fitting either a logarithmic or polynomial function of 6th order through the data points.

3. The sum of displacements, $\Delta x_{prop} + \Delta x_{sys}$, were measured of the embedment cell and compression of the partial monolayer of proppant. This was determined by pressing the proppant between steel platens.

4. The displacement of the embedment cell was then subtracted from the sum of displacements. This results in the displacement of the proppant, alone.

5. The sum of displacements of the core plus embedment cell, $\Delta x_{core} + \Delta x_{sys}$, was then measured as a function of load. This data was parameterized by fitting either a logarithmic or polynomial function of 6th order through the data points.

6. The embedment was obtained by subtracting the displacements measured in Steps 5 and 4 from the displacement measured in Step 1.

The results demonstrate less embedment using LiteProp™ 125 to Ottawa sand. The degree of embedment of LiteProp™ 125 and Ottawa sand loaded to 2000 lbs. is set forth in Table I.

TABLE 1

Summary of Proppant Embedment Results

| Measured Embedment @ 2000 lbs. | | Visual Observations |
|---|---|---|
| Ottawa Sand | | Embedment marks observed |
| Test 1 | 0.01 inches | at surface. Many crushed |
| Test 3 | 0.0075 inches | proppant grains. Some |
| Test 4 | 0.008 inches | grains fully embedded into |
| average | 0.0085 inches | surface. |
| LiteProp ™ 125 | | Some indentations |
| Test 1 | 0.000 inches | observed, but very shallow |
| Test 2 | 0.00 inches | depth. LiteProp ™ 125 |

TABLE 1-continued

Summary of Proppant Embedment Results

| Measured Embedment @ 2000 lbs. | | Visual Observations |
|---|---|---|
| average | 0.00 inches | grains were flattened into thin wafers. |

Figure 4:
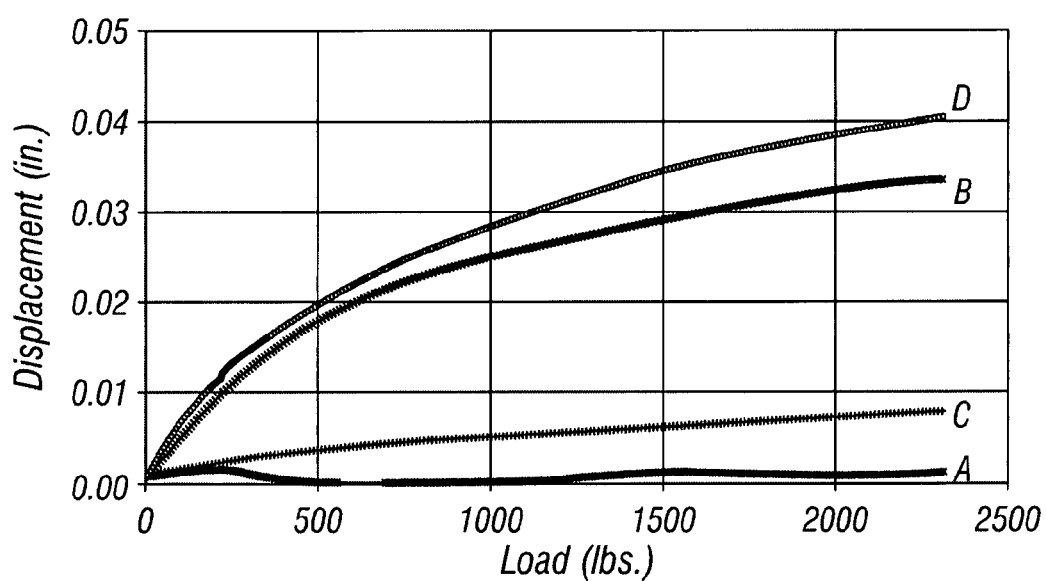
FIGS. 4-8 are displacement curves at versus loads using deformable and non-deformable proppants.
Figure 5:
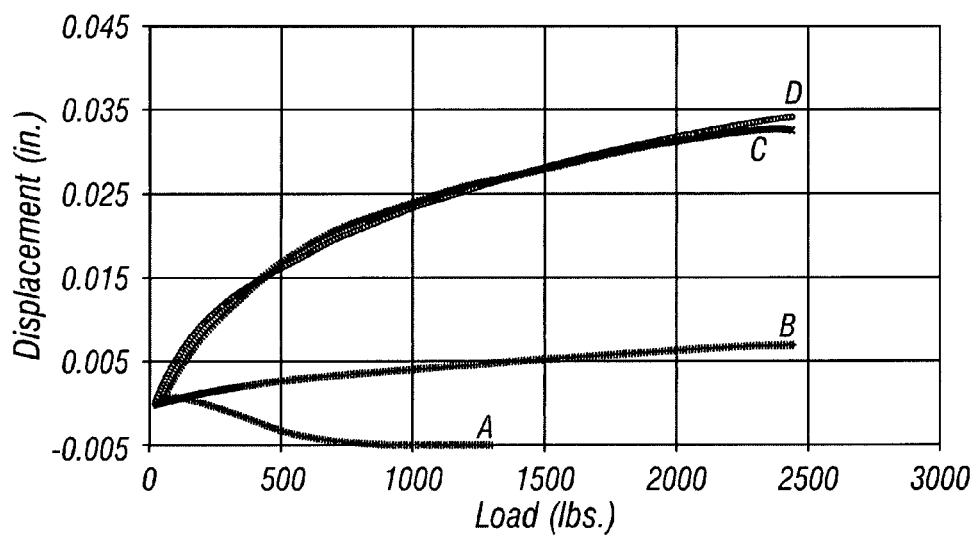
Figure 6:
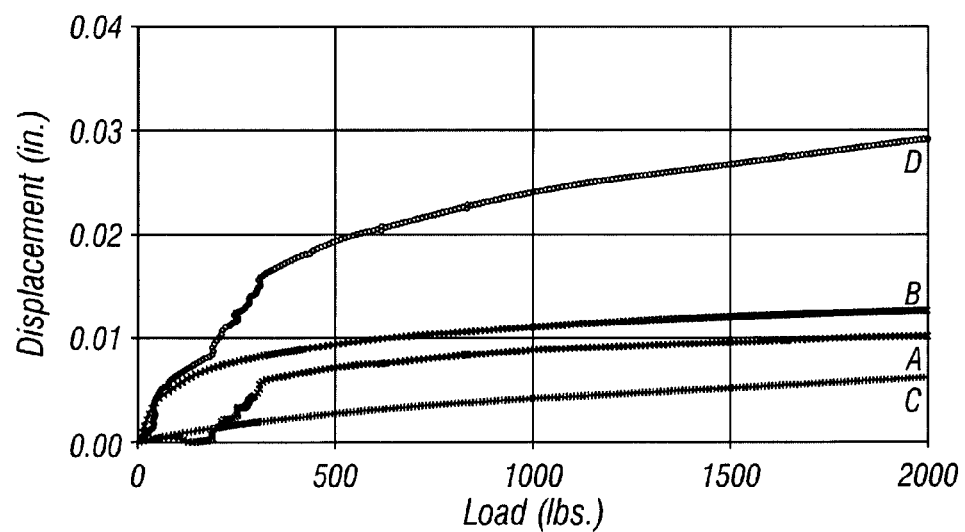
Figure 7:
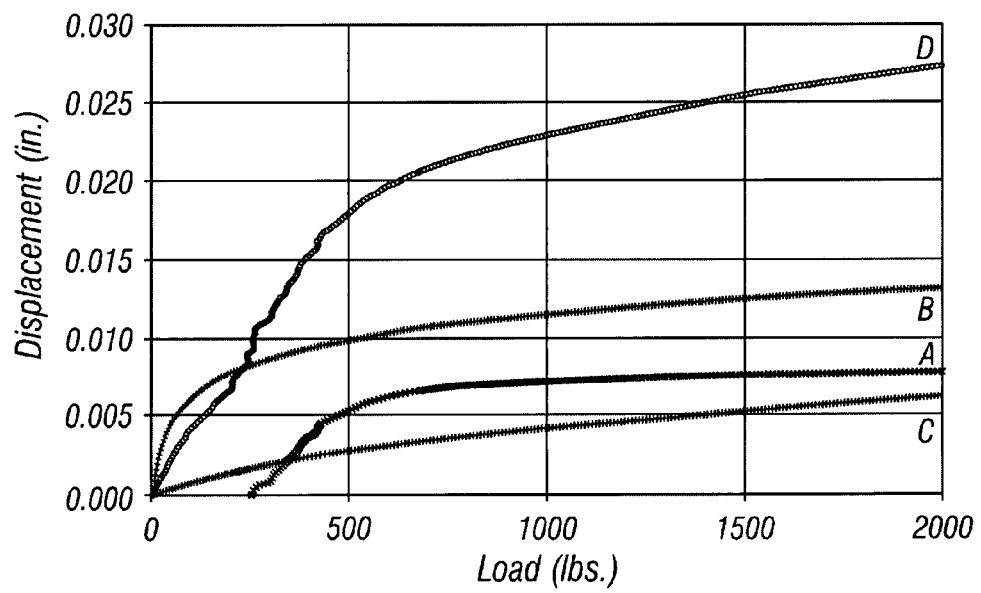
Figure 8:
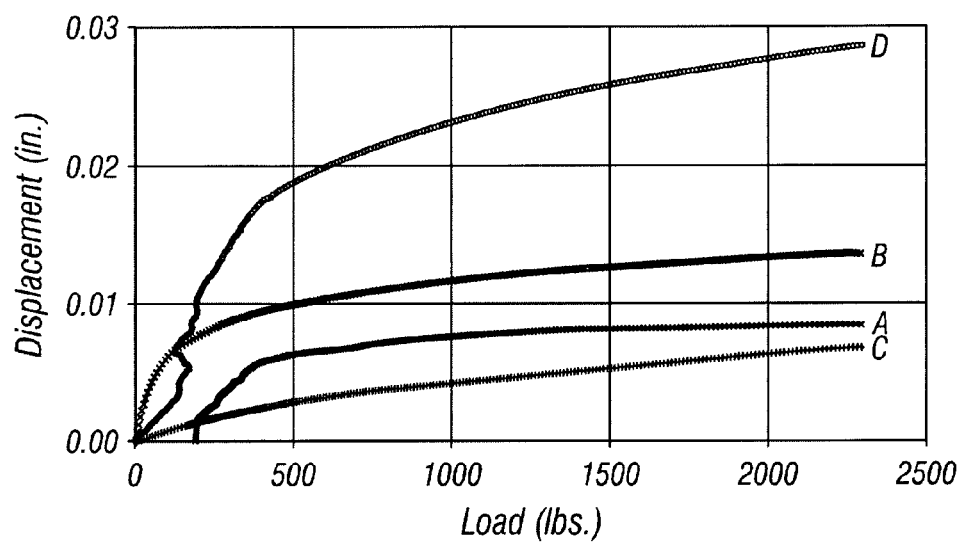

FIGS. 4-8 display displacement over various loadings, wherein Curve "A" in each FIG. represents $\Delta x_{emb}$, Curve "B" represents $\Delta x_{prop}$, Curve "C" represents $\Delta x_{core} + \Delta x_{sys}$ and Curve "D" represents $\Delta x_{gross}$. FIGS. 4-5 are displacement curves showing the deformable LiteProp™ 125 proppant and FIGS. 6-8 are displacement curves showing non-deformable Ottawa sand. The variation in response between different measurements is mainly due to differences in proppant shape among the LiteProp™ 125 proppants. The variation in the slope of the displacement vs. load is due to the increasing cross-sectional area resulting from the deformation with increasing load. The slope's trend from steep to shallow with increasing load indicates increasing effective elastic modulus coupled with the change in cross-sectional area.

Figure 9:
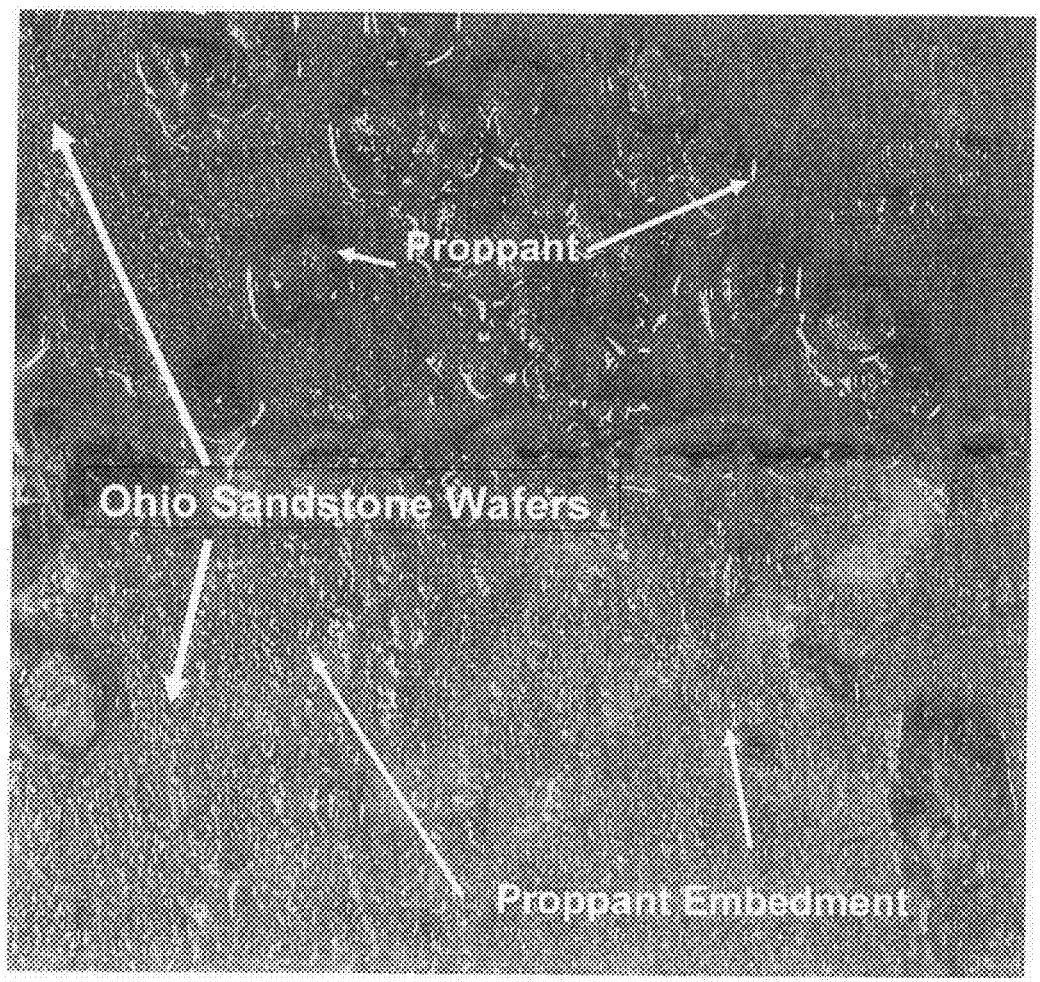
FIG. 9 (prior art) illustrates normal embedment using a non-deformable 20/40 bauxite proppant.
Figure 10:
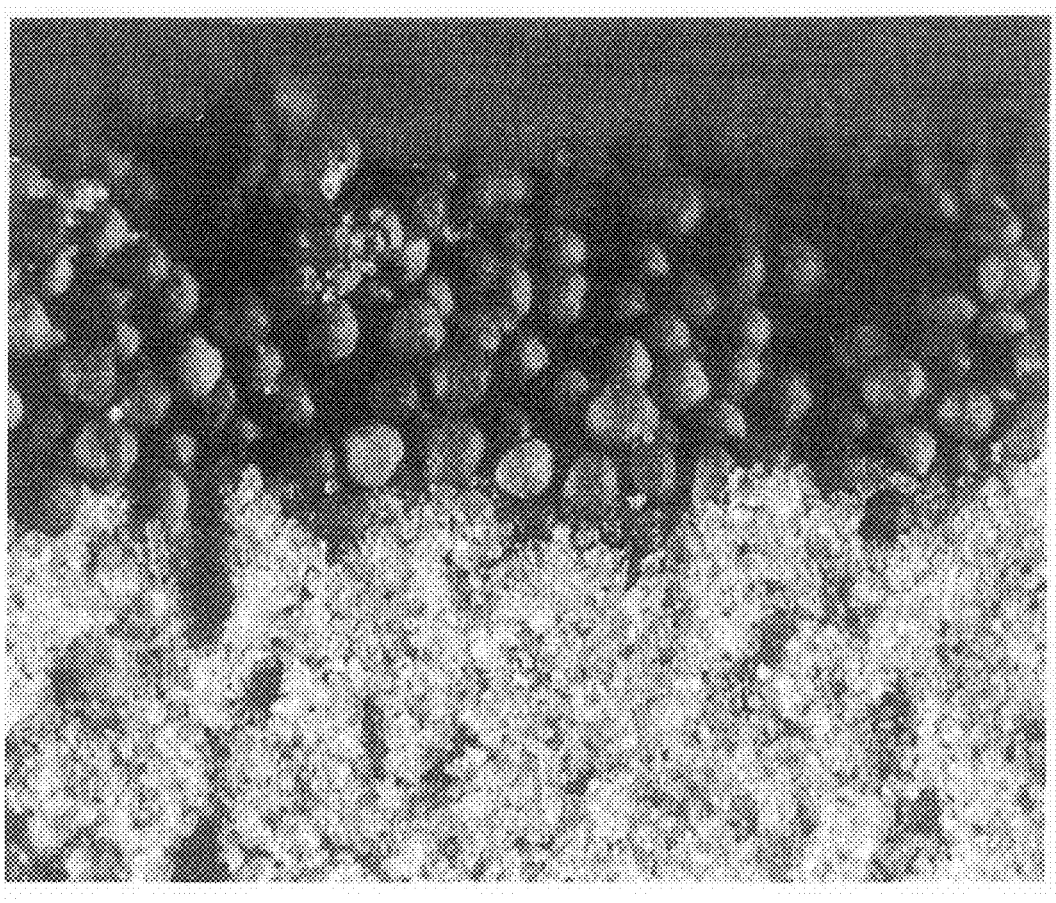
FIG. 10 illustrates the lack of embedment using a deformable proppant in accordance with the invention.

FIG. 9 is a photomicrograph at 4× magnification showing normal embedment when using Ottawa sand as (non-deformable) proppant. FIG. 10 is a photomicrograph at 10× magnification using the deformable LiteProp™ proppant. FIG. 10, unlike FIG. 9, shows minimal embedment of LiteProp™ 125. (FIGS. 4-5 demonstrate that embedment is so minimal that it could not be easily measured, as noted by the negative values over much of the load.) Thus, LiteProp™ 125 embeds less than sand under identical conditions of proppant loading and applied stress.

From the foregoing, it will be observed that numerous variations and modifications may be effected without departing from the true spirit and scope of the novel concepts of the invention. It is intended that the specification, together with the examples, be considered exemplary only, with the scope and spirit of the invention being indicated by the claims which follow.

What is claimed is:

1. A method of fracturing a subterranean formation comprising:
   introducing into the subterranean formation a fracturing fluid at a pressure above the fracturing pressure of the subterranean formation, wherein the fracturing fluid comprises a deformable proppant, the modulus of the deformable proppant being less than the modulus of the rock of the subterranean formation, the proppant being capable of providing at least a minimum level of conductivity;
   allowing the subterranean formation to close such that the energy of the closure stress is absorbed by the deformable proppant and not by the face of the rock;
   wherein embedment of the deformable proppant into the subterranean formation is minimized.

2. The method of claim 1, wherein embedment of the deformable proppant into the subterranean formation is non-existent.

3. The method of claim 1, wherein the subterranean formation is comprised primarily of coal, chalk, limestone, dolomite, shale, siltstone, diatomite, etc.

4. The method of claim 1, wherein the deformable proppant is a relatively lightweight proppant.

5. The method of claim 4, wherein the relatively lightweight proppant is an ultra lightweight (ULW) proppant.

6. The method of claim 5, wherein the ULW proppant has an apparent specific gravity less than or equal to 1.25.

7. The method of claim 1, wherein the deformable proppant is a furan, furfuryl, phenol formaldehyde, phenolic epoxy, melamine formaldehyde resin, urethane resin or a mixture thereof.

8. The method of claim 1, wherein the deformable proppant is polystyrene divinylbenzene, polystyrene/vinyl/divinyl benzene, acrylate-based terpolymer or a mixture thereof.

9. The method of claim 1, wherein said deformable proppant has an elastic modulus of between about 500,000 psi and about 4,000,000 psi at in situ formation conditions.

10. The method of claim 1, wherein the deformable proppant is a natural product selected from chipped, ground or crushed nut shells, seed shells, fruit pits and processed wood at least partially coated or hardened with a protective coating or modifying agent.

11. The method of claim 10, wherein the natural product is selected from chipped, ground or crushed (i.) walnut, pecan, coconut, almond, ivory or brazil nuts; (ii.) peach, plum, olive, cherry, or apricot seed shells.

12. The method of claim 10, wherein the natural product is derived from oak, hickory, walnut, polar or mahogany.

13. The method of claim 1, wherein the deformable proppant is beaded, cubic, cylindrical, bar-shaped, multi-faceted, irregular or tapered in shape.

14. The method of claim 1, wherein the deformable proppant has an elastic modulus of between about 500 to about 3,000,000 psi and is a natural product selected from (i.) chipped, ground or crushed walnut, pecan, coconut, almond, ivory or brazil nuts; (ii.) chipped, ground or crushed peach, plum, olive, cherry, or apricot seed shells; or (iii.) derived from oak, hickory, walnut, polar or mahogany.

15. The method of claim 1, wherein said deformable proppant has an elastic modulus of between about 500,000 psi and about 4,000,000 psi at in situ formation conditions.

16. The method of claim 1, wherein the deformable proppant is a substantially spherical or beaded proppant of polystyrene, methyl methacrylate, nylon, polycarbonates, polyethylene, polypropylene, polyvinylchloride, polypropylene, polyvinyl chloride or polyacrylonitrile-butadiene-styrene.

17. The method of claim 1, wherein the deformable proppant is a well treating aggregate of an organic lightweight material and a weight modifying agent.

18. The method of claim 17, wherein the organic lightweight material is selected from polystyrene, styrene-divinylbenzene copolymers, polyacrylates, polyalkyl acrylates, polyacrylate esters, polyalkyl acrylate esters, modified starches, polyepoxides, polyurethanes, polyisocyanates, phenol formaldehyde resins, furan resins and melamine formaldehyde resins.

19. The method of claim 17, wherein the weight modifying agent is selected from finely ground sand, glass powder, glass spheres, glass beads, glass bubbles, ground glass, borosilicate glass and fiberglass.

20. The method of claim 17, wherein the weight modifying agent is composed of (i.) a cation selected from alkali metal, alkaline earth metals, ammonium, manganese and zinc and (ii.) an anion selected from a halide, oxide, a carbonate, nitrate, sulfate, acetate and formate.

* * * * *

UNITED STATES PATENT AND TRADEMARK OFFICE
CERTIFICATE OF CORRECTION

| | | |
|---|---|---|
| PATENT NO. | : 7,322,411 B2 | Page 1 of 1 |
| APPLICATION NO. | : 11/034388 | |
| DATED | : January 29, 2008 | |
| INVENTOR(S) | : Brannon et al. | |

It is certified that error appears in the above-identified patent and that said Letters Patent is hereby corrected as shown below:

Column 11, Line 23, replace "polar" with --poplar--
Column 11, Line 33, replace "polar" with --poplar--

Signed and Sealed this

Ninth Day of September, 2008

JON W. DUDAS
*Director of the United States Patent and Trademark Office*